United States Patent [19]

Morishita

[11] Patent Number: 5,078,778
[45] Date of Patent: Jan. 7, 1992

[54] FOLIAR SPRAYING AGENT

[75] Inventor: Tadao Morishita, Kumamoto, Japan

[73] Assignee: Kabushiki Kaisha Morishita Gijutsu Kenkyujyo, Kumamoto, Japan

[21] Appl. No.: 343,174

[22] PCT Filed: Dec. 9, 1988

[86] PCT No.: PCT/JP88/01246
§ 371 Date: Apr. 6, 1989
§ 102(e) Date: Apr. 6, 1989

[87] PCT Pub. No.: WO89/05094
PCT Pub. Date: Jun. 15, 1989

[51] Int. Cl.$^5$ .............................................. C05F 7/00
[52] U.S. Cl. ............................................. 71/9; 71/10; 71/23; 71/64.1
[58] Field of Search ................... 71/1, 8, 9, 10, 11, 71/23, 27, 64.1

[56] References Cited

U.S. PATENT DOCUMENTS 2,079,514  5/1937  Leetz ................... 71/23 X
2,207,470  7/1940  Weber .................. 71/23 X

FOREIGN PATENT DOCUMENTS 40-18801  8/1965  Japan.
49-30153  3/1974  Japan.
59-39801  3/1984  Japan.
62-37003  8/1987  Japan.

Primary Examiner—Ferris H. Lander
Attorney, Agent, or Firm—Fred Philpitt

[57] ABSTRACT

A foliar spraying agent which is capable of increasing yield and improving quality of plant is obtained by grinding vegetable humus containing 50 to 80% by weight of water, contacting the resulting ground vegetable humus with air sufficiently to activate the ground product and extracting the activated product with water.

4 Claims, No Drawings

FOLIAR SPRAYING AGENT

BACKGROUND OF THE INVENTION

1. Field of the Art

This invention relates to a foliar spraying agent obtained by subjecting vegetable humus to activation treatment. Vegetable humus (or humus soil) referred to herein, is a vegetable fermented material accumulated and deposited in water at the bottom of a sea, lake, or the like for a long period of time.

2. Background of the Art

The inventor of the present application filed a prior patent application No. Sho 55-94563 for an invention relating to a gas adsorbing deodorizing and sterilizing composition which is obtained by subjecting a vegetable fermented humus to oxidation with air and then drying. This application was published (as Japanese patent publication Sho 62-1362) and registered (as patent No. 1393474).

Various application fields for this composition are now being developed. Their forms are varied, for example, they can be a powder, an aqueous extracted liquid, granules, etc. depending upon the application field.

This invention relates to an aqueous extract that will be referred to herein as Hyumaselurabin (Trade Mark). The inventor has done research work with the object of producing compositions having powerful sterilizing properties and deodorizing and gas adsorbing properties by the air treatment of vegetable humus and has filed a Japanese application entitled "a method for activating vegetable humus"; Japanese patent application Sho 57-144615. The gist of this invention can be summarized as follows. The activation of vegetable humus is a collective expression for the reinforcement of deodorizing action, gas adsorbing property and bacteriostatic action, etc. The inventor discovered that in the activation of vegetable humus, the action of microorganisms, particularly the action of aerobic microorganisms, plays a significant part together with the oxidation action of the oxygen in air. He found that as a condition for treatment, contact with air should be carried out at a temperature and a humidity at which microorganism reaction is carried out smoothly by way of microorganism, and it is an important point of activation. Thus, publication of this application was made on August 10, Showa 62 (1987) with regard to "a method for activating vegetable humus" (Japanese patent publication No. Sho 62-37003) which defines the condition for activating vegetable humus. This patent publication explains the meaning of the phrase "grinding vegetable humus and contacting sufficiently with air to effect activation" which is referred in the present invention.

By the treatments above-mentioned, activated vegetable humus greatly improves its own gas adsorbing property, deodorizing power and bacteriostatic action, but at the same time unexpected effectivenesses has been discovered.

POINT OF PROBLEM TO BE SOLVED BY THE INVENTION

During the course of developing application fields for hyumaselurabin (trademark J. 1588035) I found that it improves the water raising of cut flowers and has superior effectiveness for keeping flowers alive and I filed an application covering its use as a preserving agent for cut flowers (Japanese patent application Sho 57-14776). Later, while I was observing the water raising of cut flowers and cut leaves, I found that there are some plants which create roots from cut parts. Further, from the effectiveness of recovering vigor observed in the case of flower arrangements, I gradually paid attention to this physiological effects. While I was working to advance applications for hyumaselurabin in which these physiological effects can be utilized, I found that this material has superior effectiveness as a foliar spraying agent.

Hyumaselurabin is an aqueous extract obtained by immersing activated vegetable humus in hot water followed by stirring and filtering. This material usually shows a pH of 3 or less, and a Brix degree of 0.4 or more, but as a preserving agent for cut flowers, dilution with water by 30 to 50 times the original, is adequate.

DISCLOSURE OF THE INVENTION

It has been known that plants have the ability of absorbing nutrients not only from roots but also from leaves, but the practical use of supplying nutrient from leaves in agriculture started about 1940. The advantage of foliar spraying over fertilizer application to the soil, is that it serves the purpose with a relatively small amount of material, and shows quick effectiveness.

The foliar spraying agents which are now practically used are in a state containing not only macro nutrients such as nitrogen, phosphoric acid, potassium or the like, but also so-called trace elements. In short, since foliar spraying agents are used with the object of supplying deficient elements rapidly, it is necessary to select the deficient elements properly and to apply the foliar spray at the proper concentration depending upon the kind of plant, the stage of growth of the plant and the symptoms of deficiency.

I paid attention to the life-extension effectiveness of hyumaselurabin via improving the water raising of cut-flowers and the effectiveness of recovery of plant or tree vigor, and I tried foliar spraying, selecting tea leaves as a test object with the expectation that hyumaselurabin can develop physiological activity effect to a plant rapidly.

Namely hyumaselurabin to be tested (pH=3.0, Brix degree=0.6) was diluted with water and prepared in 500 time, 800 time and 1000 time diluted solutions respectively. One week before tea-defoliation, foliar sprayings were conducted with each of the above-mentioned dilutions of hyumaselurabin. When yields of tea-leaves within a frame of 30 cm square, carried out by hand picking, were compared by weighing, it was found that the higher the concentration of Hyumaselurabin, the higher the yield, and increase of yields of the solutions of 1000 time dilution, 800 time dilution and 500 time dilution were magnified 1.17 times, 1.34 times and 1.40 times, respectively. At the same time, it was observed that the lustre and the color of the leaves improved, the thickness of the leaves increased and the vigor of the stems of leaves also improved.

It is surprising that such significant differences appeared one week after foliar spraying. Considering the relation of dilution and magnification to yields, there is not a great difference between 500 time magnification and 800 time magnification. It is considered that 800 time magnification is the most suitable concentration as a foliar spraying agent for tea if injury by concentration is to be considered at the same time.

Further, foliar sprayings were tried for strawberry, melon, watermelon, cucumber, tomato, seedling of egg plant, spinach, broad bean, Chinese cabbage, Kinusaya (a kind of pea), Miendo (another kind of pea), Kanran (a kind of orchid), omoto (Rhodea japonica), chrysanthemum, young rice plant, tobacco plant, horse radish (in the forest) and Chinese mustard. Dilution was standard at 1000-2000 times for vegetables, because if the concentration is too high, there may be a danger of chemicals damage. For trees, a slightly more concentrated solution than the above-mentioned, e.g. 800-1000times was standard.

As for spraying amount, 100-150 liter per 10 ares (0.247 acres), 2 or 3 times spraying, at 1 to 3 weeks intervals is standard.

As for the foliar spraying of hyumaselurabin, both an increase of crop and improvement of quality were remarkable, and particularly a repellent effectiveness to pests such as leaf-plant-infesting acarid (mite). Root spreading, and the vigor of the leaf-stem become better and the probability of the appearance of new buds becomes greater. The bearing of flower buds is increased and the color and lustre of flowers are improved and leaves are thickened. Infestation with acarid become less and pathogenic fungi are controlled. As a result of the above-mentioned factors there is brought about an increase of yield and an improvement of quality.

In hyumaselurabin the presence of adequate amounts of minerals such as manganese, iron, sodium, calcium, magnesium, copper, zinc, molybdenum, etc. and the existence of various kinds of amino acids and vitamins has been confirmed.

The effectiveness of hyumaselurabin as a foliar spraying agent seems to be the result of the collective effect of these various kinds of components.

Hyumaselurabin is usually used by itself, but it does not matter even when it is admixed with urea or other foliar spraying fertilizer, or agricultural chemicals depending upon their the need for them.

Best Mode for Reduction of the Invention into Practice

EXAMPLE 1

Hyumaselurabin original liquid (pH=3.0, Brix degree =0.6) was diluted 500 times, 800 times and 1000 times to prepare diluted solutions and each diluted solution used for the foliar sprayings of tea leaves. As a control, foliar spraying was conducted at the same time with water alone. The gist of the spraying manner involved, spraying once one week before picking (tea-picking) (June 5, Kagoshima Prefecture). Sprayings were conducted at the east side of tea field and at the west side thereof to check the influence of position. One week after spraying, pickings were conducted by hand picking and the weight of tea leaves gathered within a 30 cm frame was weighted and results shown below were obtained.

| Dilution magnification | spraying position | weight (gr.) of hand picking within a 30 cm frame | conversion per 10 ares yield (kg) |
| --- | --- | --- | --- |
| control (water alone) | west | 70 | 630 |
|  | east | 80 | 720 |
| 1000 times | west | 85 | 765 |
|  | east | 90 | 810 |
| 800 times | west | 100 | 900 |
|  | east | 101 | 909 |
| 500 times | west | 105 | 945 |
|  | east | 105 | 945 |

EXAMPLE 2

To fruit-vegetables, leaf-vegetables, pulse and flowering plants, foliar spraying of hyumaselurabin in aqueous dilute solutions were conducted. The effectiveness of these foliar sprayings are shown below.

|  |  | Dilution magnification of Hyumaselurabin | Effectiveness |
| --- | --- | --- | --- |
| Fruit vegetables | strawberry | 1,500 | vigor of tree was increased. |
|  | melon, | 1,000 | quality was improved. |
|  | water melon cucumber, tomato, egg plant | 1,000 | yield was increased. |
| Leaf vegetables | spinach | 2,000 | repelling of foliar blight attained. |
|  | Chinese cabbage | 2,000 | resistance to disease was increased. |
|  | Chinese mustard | 2,000 | quality was improved. |
| Beans | Broad bean | 1,000 | vigor of tree was improved. |
|  | Kinusaya | 1,000 | yield was increased. |
|  | Miendo | 1,000 |  |
| Flower plants | Kanran(orchid) | 1,200 | occurrence of infesting with acarid becomes less. color, luster of flower and leaves were improved. occurrence of flower buds becomes greater. |
|  | Rhodea japonica | 1,000 |  |
|  | chrysanthemum | 1,500 |  |

What is claimed is:

1. A method for improving the growth of leaves on a plant which consists of spraying on the leaves of the plant an aqueous extract produced by
   (a) grinding a mass of vegetable fermented material containing 50 to 80% water that has been obtained from deposits that have been on the bottom of a sea, lake or the like for a long period of time,
   (b) contacting the ground product of step (a) with air to thereby activate the ground product of step (a),
   (c) contacting the product resulting from step (b) with water with stirring, and
   (d) filtering the product of step (c) and recovering the aqueous extract.

2. A method according to claim 1 wherein said extract is diluted with water.

3. A method according to claim 1 wherein said extract is diluted with a volume of water that is from 500 to 1000 times greater than the volume of aqueous extract.

4. A method according to claim 1 wherein said aqueous extract has a pH of 3 or less and a Brix of 0.4 or more.

* * * * *